United States Patent
Makinen et al.

(10) Patent No.: US 7,038,405 B2
(45) Date of Patent: May 2, 2006

(54) CONTROL OF PARALLEL OPERATION OF FREQUENCY CONVERTERS OR INVERTERS

(75) Inventors: Jukka-Pekka Makinen, Helsinki (FI); Pekka Haapamäki, Kerava (FI); Tero Halkosaari, Lempäälä (FI)

(73) Assignee: Vacon Oyj, Vaasa (FI)

( * ) Notice: Subject to any disclaimer, the term of this patent is extended or adjusted under 35 U.S.C. 154(b) by 0 days.

(21) Appl. No.: 10/951,773

(22) Filed: Sep. 29, 2004

(65) Prior Publication Data

US 2005/0067984 A1 Mar. 31, 2005

(30) Foreign Application Priority Data

Sep. 30, 2003 (FI) ................................. 20031407

(51) Int. Cl.
*H02P 5/46* (2006.01)

(52) U.S. Cl. .................... 318/78; 318/727; 318/801

(58) Field of Classification Search ................ 318/78, 318/727, 801; 363/65, 69, 71; 710/107; 395/829
See application file for complete search history.

(56) References Cited

U.S. PATENT DOCUMENTS

| | | | |
|---|---|---|---|
| 3,600,655 A | 8/1971 | Karlin | |
| 3,686,548 A | 8/1972 | Onoda et al. | |
| 4,517,771 A | 5/1985 | Kobayashi et al. | |
| 5,928,345 A * | 7/1999 | Tetzlaff et al. | 710/107 |
| 6,088,248 A * | 7/2000 | Schenk et al. | 363/65 |
| 6,188,591 B1 * | 2/2001 | Ruter et al. | 363/65 |
| 2002/0005704 A1 * | 1/2002 | Yoshikawa et al. | 318/727 |

FOREIGN PATENT DOCUMENTS

WO    WO-95/06373    3/1995

OTHER PUBLICATIONS

"DriveIT Low Voltage AC Drive," "Solution Products," pp. 64-71, Oct. 24, 2002.

* cited by examiner

*Primary Examiner*—Karen Masih
(74) *Attorney, Agent, or Firm*—Birch Stewart Kolasch & Birch LLP

(57) ABSTRACT

A method and a system for controlling parallel-connected frequency converters or inverter units feeding an alternating-current motor (MOTOR1) provided with parallel windings or separate parallel motors having their shafts mechanically coupled together via a load, in which method the current supplied to the motor is measured.

The frequency converters/inverter units are connected to each other via a data bus, e.g. a fast serial bus, and one of the frequency converters/inverter units (FCON1 or INU1) functions as a master device in such manner that it sends to the other device/devices (FCON2 or INU2) information over the data bus regarding the instantaneous value of the current ($I_{W1}$) fed by it to the motor, said other devices functioning as follower devices so that they adjust their own current ($I_{W2}$) on the basis of the current of the master device.

19 Claims, 2 Drawing Sheets

CONTROL OF PARALLEL OPERATION OF FREQUENCY CONVERTERS OR INVERTERS

CROSS REFERENCE TO RELATED APPLICATION

This application claims priority under 35 U.S.C. § 119 to Finnish Application No. 20031407 filed Sep. 30, 2003. The entire contents of the above-identified application is hereby incorporated by reference.

BACKGROUND OF THE INVENTION

1. Field of Invention

The present invention relates to a method for controlling parallel-connected frequency converters or inverter units feeding an alternating-current motor provided with parallel windings or separate parallel motors having their shafts mechanically coupled together via a load. The invention also relates to an arrangement for parallel connection of frequency converters or inverter units.

2. Description of Related Art

In high-power motors it is possible to use several parallel windings which are galvanically separate from each other and which can be connected in a desired manner. The windings be mounted at least partly in the same slots, in which case a strong magnetic coupling exists between the windings. The stator of the motor may also be divided into separate segments, so that it consists of several separate stators whose windings have no mutual magnetic coupling. The motor may be either an asynchronous or a synchronous motor.

In a prior-art arrangement for feeding a high-power multi-winding motor by a frequency converter, the frequency converter consists of several lower-power units (either separate complete frequency converters or inverter units connected to a common DC supply) which generate their output voltages in synchronism with each other. Therefore, each edge of the output voltage is as simultaneous as possible, which is achieved by an arrangement whereby a common control unit distributes the control pulses to the semiconductor switches, such as insulated gate bipolar transistors (IGBT), simultaneously to each parallel-connected frequency converter or inverter unit.

However, due to the non-ideal properties of the system (differences in signal transit times, different switching times of IGBT switches, differences in windings, etc.), the currents of the parallel-connected units are not necessarily evenly distributed. From this it follows that the system has to be designed according to the worst situation, which means that the achievable maximum power of the system is lower than the sum of the nominal powers of the parallel-connected units. To smooth out the current differences and thus to increase the total power, it is possible to add smoothing inductors between the frequency converters and the motor, which has the disadvantage of increasing the costs.

BRIEF SUMMARY OF THE INVENTION

The object of the present invention is to create a motor drive implemented using a frequency converter or inverter for cases where a high-power motor has several windings in parallel. The same arrangement of the invention can also be applied to implement a motor drive in which the shafts of several separate motors are mechanically coupled via a common load.

According to the invention, each winding of a high-power multi-winding motor or each separate parallel motor having their shafts mechanically coupled together via common load is fed by a separate frequency converter or a separate inverter unit which are connected to each other via a data bus (e.g. a fast serial bus), allowing the currents to be evenly distributed among all parallel windings or parallel separate motors. This ensures uniform loading of the system, which is advantageous in respect of maximum load capacity and heat generation and therefore in respect of service life.

The arrangement of the invention affords several advantages, such as;

the system is of modular construction and easily extendable the frequency converters or inverter units are identical, which is advantageous in respect of maintenance, among other things the system us redundant; a failure of one frequency converter, inverter unit or winding will not necessarily stop the motor drive completely, but it can continue operating at a lower power a high overall power is achieved by using low-power frequency converter or inverter units.

The features characteristic of the method of the invention and the corresponding frequency converter/inverter arrangement are presented in detail in the attached claims.

BRIEF DESCRIPTION OF THE DRAWINGS

In the following, the invention will be described in detail with reference to an example and the attached drawings, wherein.

DETAILED DESCRIPTION OF THE INVENTION

Figure 1:
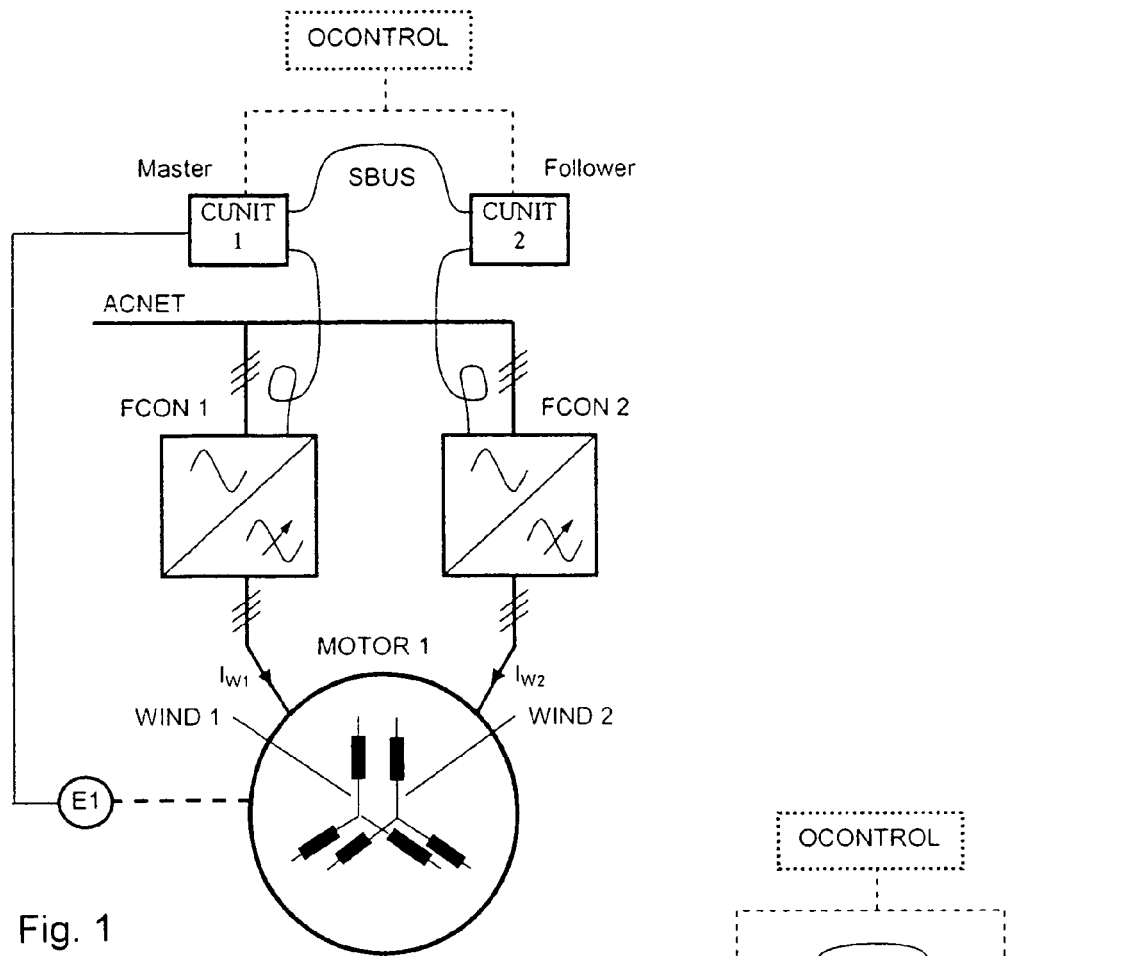
FIG. 1 presents an example of a motor drive in which two double-winding alternating-current motors are fed by frequency converters connected in parallel according to the invention.

FIG. 1 presents a motor drive in which a high-power alternating-current motor MOTOR1, which may be an asynchronous or synchronous motor and which has two windings WIND1 and WIND2, is fed by two three-phase frequency converters FCON1 and FCON2 connected to a three-phase mains supply ACNET and each comprising a rectifier, a direct-voltage intermediate circuit and an inverter, the frequency converters feeding the motor with a variable-frequency alternating voltage.

Figure 2:
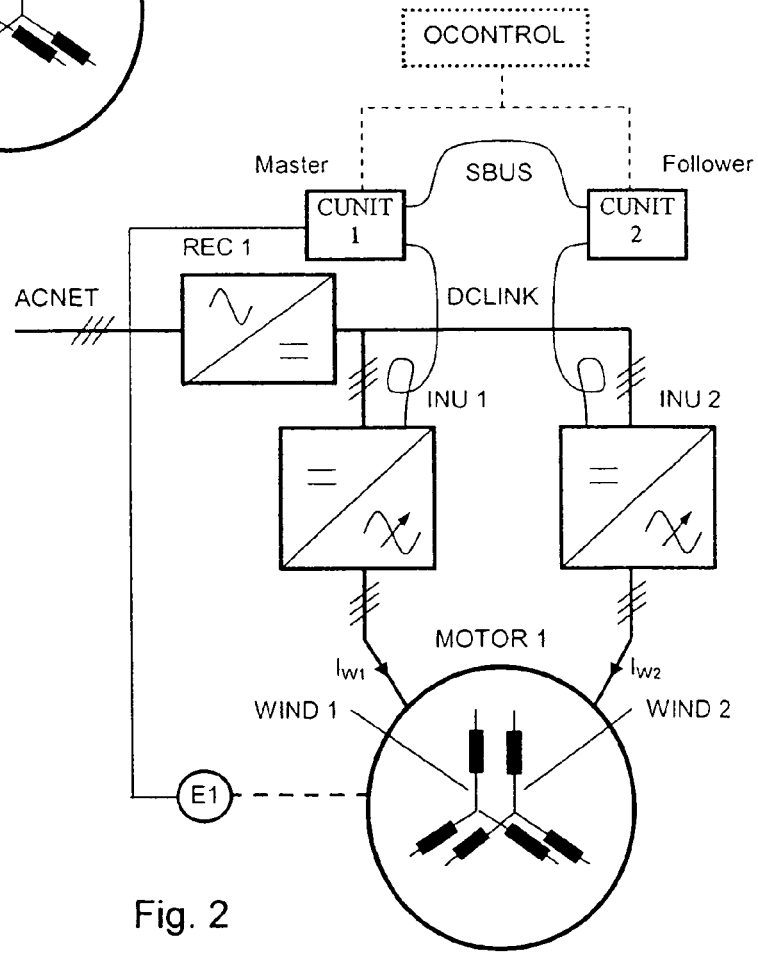
FIG. 2 presents an example of a motor drive in which a double-winding alternating-current motor is fed according to the invention by parallel-connected inverter units connected to common DC rails.

FIG. 2 presents a corresponding example in which two inverter units INU1 and INU2 are connected to a common direct-current supply DCLINK, which is fed by a rectifier unit REC1 common to the system.

Each frequency converter or inverter unit has its own control unit CUNIT1 and CUNIT2, which are connected to a system control unit OCONTROL.

Figure 3:
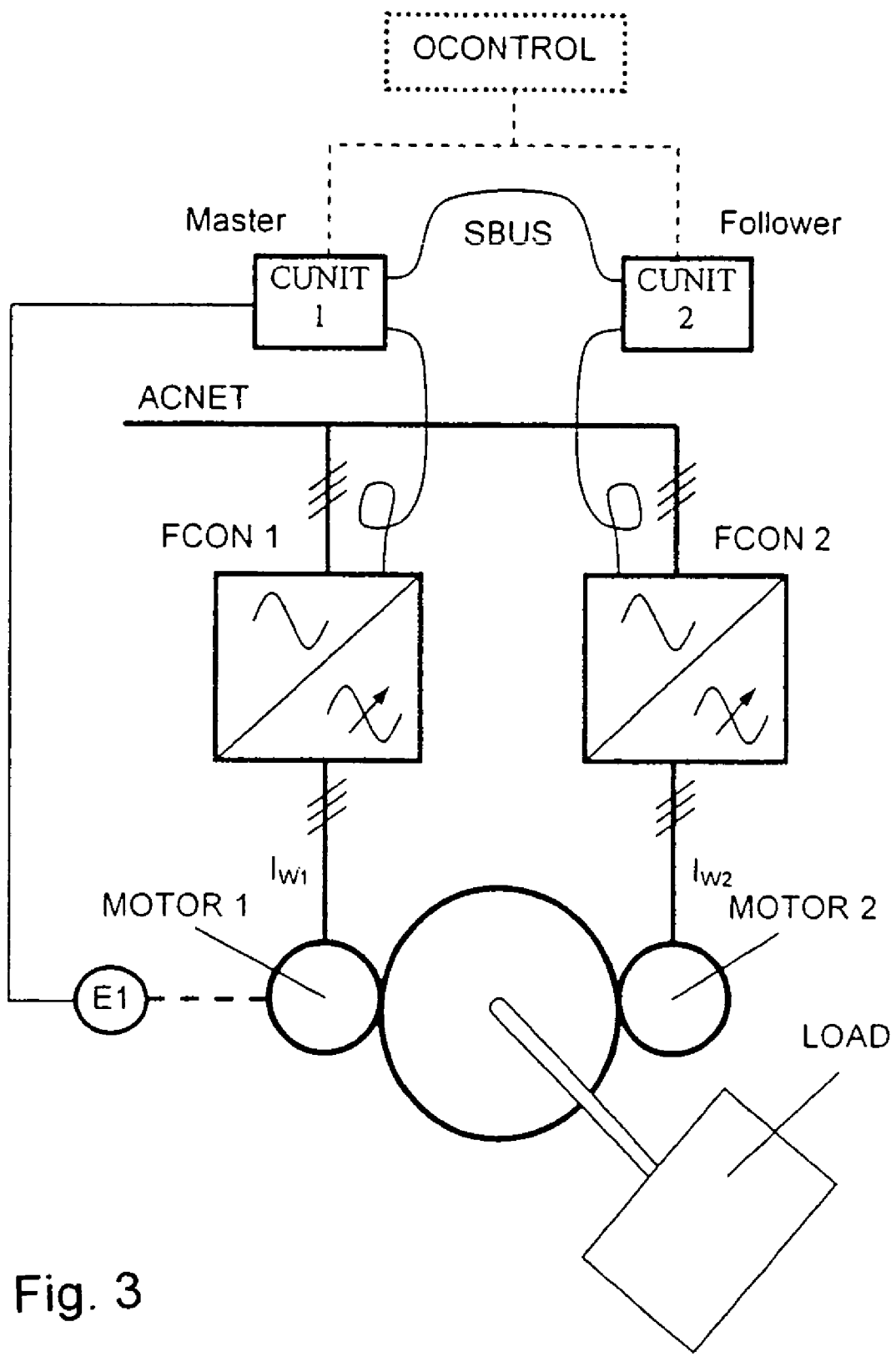
FIG. 3 presents an example of a motor drive in which two separate motors are mechanically coupled together via a common load and the motors are fed by frequency converters connected in parallel according to the invention.

The method of the invention works as follows:

Each winding of the multi-winding motor is fed by a separate frequency converter or separate inverter unit, such as FCON 1 and FCON2 in the example presented in FIG. 1 or INU1 and INU2 in the example in FIG. 2. Separate motors are fed in a corresponding manner in accordance with the example in FIG. 3 when the motors feed a common load and their shafts are coupled together via the load. The frequency converters or the inverter units are interconnected by a data bus SBUS, which may be e.g. a fast serial bus. One of the frequency converters or inverter units functions as master (Master) and the others as followers (Follower). The Master frequency converter of the system, which may be e.g. FCON1 in the example in FIG. 1, sends the instantaneous value of the current $I_{W1}$ it is feeding to the motor over the fast data bus (SBUS) to the frequency converter serving as a follower, which, by means of the output voltage it generates, adjusts the current $I_{W2}$ fed by it to its own windings to the same magnitude and phase with the current of FCON1. In this way, the currents fed by all the parallel-connected frequency converters or inverter units to the motor/motors can be distributed evenly among all the windings, thereby ensuring that the system will be evenly loaded, which is advantageous e.g. in respect of maximum load capacity and heat generation and therefore in respect of service life, too.

Between the currents supplied by the master and the followers, it is also possible to set a desired phase shift angle or a desired ratio of the currents. This may provide an advantage e.g. in respect of smoothness of the torque generated by the motor/motors.

The system can operate both in a so-called open loop mode, in which case no feedback on the rotational speed of the motor is obtained, and in a so-called closed loop mode, in which case the master frequency converter FCON1 or master inverter unit INU1 receives information about the rotational speed of the motor from a tachometer E1 mounted on the shaft.

As stated above, the system is redundant; a failure of one frequency converter or winding will not necessarily stop the entire motor drive, but it can continue operating at a reduced power level (if the master fails, then one of the followers can be appointed as new master either manually or by a higher control system). In the case of separate motors, the redundancy also applies to failures of an entire motor or separate tachometers connected to them.

It is obvious to the person skilled in the art that different embodiments of the invention are not limited to the example described above, but that they may be varied within the scope of the claims presented below.

The invention claimed is:

1. A method for controlling parallel-connected frequency converters or inverter units feeding an alternating-current motor (MOTOR1) provided with parallel windings or separate parallel motors having their shafts mechanically coupled together via a load, in which method the current supplied to the motor is measured,
    connecting the frequency converters/inverter units to each other by a fast serial bus, and
    wherein one of the frequency converters/inverter units (FCON1 or INU1) functions as a master device in such manner that it sends to the other device/devices (FCON2 or INU2) information over the data bus regarding the instantaneous value of the current ($I_{W1}$) fed by it to the motor, said other devices functioning as follower devices so that they adjust their own current ($I_{W2}$) on the basis of the current of the master device.

2. The method according to claim 1,
    wherein the currents of the other devices are so adjusted that their magnitude and phase are the same as those of the current of the master device.

3. The method according to claim 1,
    wherein the current of the other devices is so adjusted that a given phase shift angle or current ratio exists between the currents of the master device and the follower devices.

4. The method according to claim 1,
    wherein the system operates in a open loop mode, with no feedback on the rotational speed of the motor.

5. The method according to claim 1,
    wherein the system operates in a closed loop mode, in which case the master frequency converter (FCON1) receives information about the rotational speed of the motor from a tachometer (E1) or equivalent mounted on the shaft.

6. The method according to claim 1,
    wherein when the master fails, one of the followers can be appointed as new master either manually or by a higher control system.

7. The method according to claim 2,
    wherein the system operates in a open loop mode, with no feedback on the rotational speed of the motor.

8. The method according to claim 3,
    wherein the system operates in a open loop mode, with no feedback on the rotational speed of the motor.

9. The method according to claim 2,
    wherein the system operates in a closed loop mode, in which case the master frequency converter (FCON1) receives information about the rotational speed of the motor from a tachometer (E1) or equivalent mounted on the shaft.

10. The method according to claim 3,
    wherein the system operates in a closed loop mode, in which case the master frequency converter (FCON1) receives information about the rotational speed of the motor from a tachometer (E1) or equivalent mounted on the shaft.

11. The method according to claim 2,
    wherein when the master fails, one of the followers can be appointed as new master either manually or by a higher control system.

12. The method according to claim 3,
    wherein when the master fails, one of the followers can be appointed as new master either manually or by a higher control system.

13. The method according to claim 4,
    wherein when the master fails, one of the followers can be appointed as new master either manually or by a higher control system.

14. The method according to claim 5,
    wherein when the master fails, one of the followers can be appointed as new master either manually or by a higher control system.

15. The method according to claim 1, wherein the master device and the follower devices are identical to each other.

16. A system for controlling parallel-connected frequency converters or inverter units feeding an alternating-current motor (MOTOR1) provided with parallel windings or separate parallel motors having their shafts mechanically coupled together via a load, said system comprising a measuring arrangement for the measurement of motor current,
    wherein the frequency converters/inverter units are connected to each other by a fast serial bus, and
    wherein one of the frequency converters/inverter units (FCON1 or INU1) functions as a master device in such manner that it sends to the other device/devices (FCON2 or INU2) information over the data bus regarding the instantaneous value of the current ($I_{W1}$) fed by it to the motor, said other devices functioning as follower devices so that they adjust their own current ($I_{W2}$) on the basis of the current of the master device.

17. The system according to claim 16, wherein in a open loop mode, there is no feedback on the rotational speed of the motor.

18. The system according to claim 16, wherein the system operates in a closed loop mode, in which case the master frequency converter (FCON1) receives information about the rotational speed of the motor from a tachometer (E1) or equivalent mounted on the shaft.

19. The system according to claim 16, wherein the master device and the follower devices are identical to each other.

\* \* \* \* \*